No. 649,943. Patented May 22, 1900.
W. F. C. MORSELL.
SCALE.
(Application filed June 12, 1899.)
(No Model.) 2 Sheets—Sheet 1.
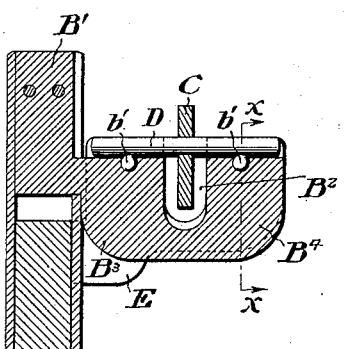
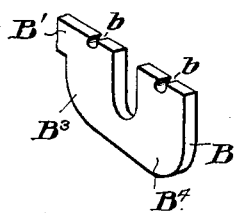
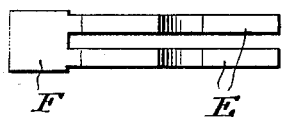
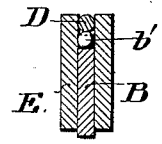
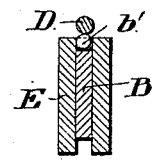
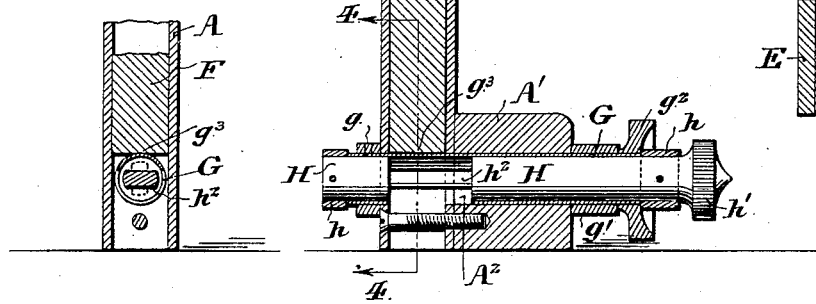
WITNESSES:
INVENTOR:
W. F. C. Morsell,
By his attorneys
Wm C. Strawbridge
F. Norman Dixon
THE NORRIS PETERS CO., PHOTO-LITHO., WASHINGTON, D. C.

No. 649,943. Patented May 22, 1900.
W. F. C. MORSELL.
SCALE.
(Application filed June 12, 1899.)
(No Model.) 2 Sheets—Sheet 2.

WITNESSES:

INVENTOR:
W. F. C. Morsell,
By his Attorneys
Wm C Strawbridge
F. Norman Dixon

UNITED STATES PATENT OFFICE.

WILLIAM F. C. MORSELL, OF PHILADELPHIA, PENNSYLVANIA.

SCALE.

SPECIFICATION forming part of Letters Patent No. 649,943, dated May 22, 1900.

Application filed June 12, 1899. Serial No. 720,274. (No model.)

*To all whom it may concern:*

Be it known that I, WILLIAM F. C. MORSELL, a citizen of the United States, residing in the city and county of Philadelphia, in the State of Pennsylvania, have invented certain new and useful Improvements in Scales, of which the following is a description.

It is the object of my invention to provide a balancing connection or contact between the balance bar and the body of a scale, of such character that said bar shall be very sensitive and responsive to the most minute degrees of weight,—of such form and arrangement that the contacting parts are not only subject to the minimum of wear in action but are practically unaffected in delicacy and accuracy by any such slight wear of the parts as does occur,—and provided with devices by which misadjustment of the contacting parts may be instantaneously and easily corrected or such contacting parts be physically maintained in operative relation for ordinary weighing in which very great minuteness and accuracy are not required.

This object I accomplish in the apparatus illustrated by providing a supporting arm equipped with rounded upwardly extending projections, and a balance bar having trunnions the lower faces of which are rounded and rest and bear upon the rounded projections of the arm, with the result that the balance bar with its usual attachments, on the one hand, and the supporting arm, on the other hand, are in contact with each other through such oppositely disposed rounded faces.

The balance bar, therefore, in the apparatus illustrated, rests and rolls on the rounded faces of its trunnions upon a rounded surface fixed with respect to and constituting in effect a part of the fixed arm of the scale, and the contact between these two rounded surfaces constitutes the only contact, when the parts are in a given position, between the balance bar and the body of the scale, with the result that the balance bar is exceedingly sensitive and responsive to weights of infinitesimal character.

My invention further comprehends the provision of a centering and retaining cage, as I term it, by which the balance bar may be restored to proper position should its rounded faces by any means slip laterally from the rounded supporting faces of the arm, and by which, furthermore, when articles as to which no great accuracy is desired are to be weighed, the rounded surfaces of the bar may be held in position upon the rounded surfaces of the arm during such weighing.

In the accompanying drawings I show, and herein I describe, a good form of a convenient embodiment of my invention, the particular subject-matter claimed as novel being hereinafter definitely specified.

It is to be understood that the embodiment of my invention represented in the drawings and herein described is typical merely and susceptible of innumerable changes and variations in construction and arrangement without departure from the spirit of my invention.

In the accompanying drawings,

Figure 1 is a vertical, sectional, elevation, through the supporting standard, the supporting arm, and the balance bar, of a scale embodying my invention.

Figure 2 is a view in perspective of the supporting arm.

Figure 3 is a top plan view of the centering and retaining cage.

Figure 4 is a fragmentary sectional plan on the line 4—4 of Figure 1.

Figure 8:
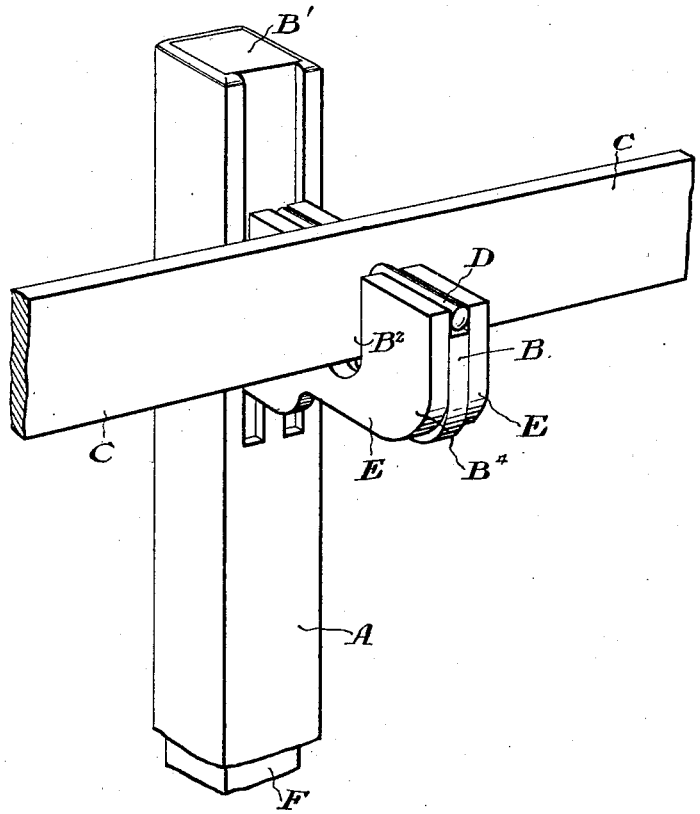

Figures 5, 6, and 7, are vertical, sectional, elevational, details on the dotted line $x$—$x$ of Figure 1, illustrating the respective positions of the cage with respect to the supporting arm and balance bar.

Figure 8 is a view in perspective illustrating the supporting arm, the cage, the central portion of the balance bar, and associated parts.

Similar letters of reference indicate corresponding parts.

In the accompanying drawings the body of the scale consists of a tubular standard A vertically erected from a suitable base A', which base, in the form of my invention illustrated, embodies a horizontal recess $A^2$ which intersects the tubular bore of the standard A.

B is the supporting arm, the same consisting, in the form illustrated, of a horizontally-extending plate, the inner end or shank B' of which is rigidly fixed to and conveniently disposed within the interior of the standard A, and the body of which is divided, by a central recess B², provided for the reception of the balance bar, into the two bearing blocks B³ B⁴.

The upper faces of these blocks are to be provided with rounded projections as stated, and I prefer to form said rounded projections by mounting small steel spheres $b'$ in said upper faces.

I prefer to mount said spheres by disposing them within transversely extending grooves $b$ cut in the upper surface of the bearing plates B³ B⁴, which are of such shallow depth that portions of the spheres project above the upper faces of the plates.

The spheres are preferably of diameter corresponding to the thickness of the plate in which they are mounted.

The spheres are rigidly secured in position in their grooves in the supporting arm in such manner as to become fixed permanent portions of said arm, as for instance, by swaging in the metal at the ends of the grooves $b$, and the upper portions of said spheres constitute hemispherical projections.

C is the balance bar, of any preferred form, provided with the trunnions D. Said trunnions D are conveniently formed by mounting a cylindrical stud in a suitable recess in said bar, as shown in Figure 1, and, said bar, being cylindrical, itself presents or constitutes the rounded faces which are as hereinbefore stated to be placed in rolling contact with the rounded projections of the supporting arm.

When the balance bar is mounted and balanced upon the rounded surfaces of the supporting arm, it is capable of oscillation thereon, its trunnions rolling in its movement backward and forward across the rounded tops of said surfaces, and only becoming displaced or sliding laterally from such surfaces when the bar makes a violent dip, which may usually be avoided by careful operation of the apparatus.

E constitutes what I term a cage, the same consisting in the apparatus illustrated, of a pair of plates conveniently of the same general profile as the supporting arm, maintained in parallelism, and disposed one upon each side of said arm.

The supporting arm and cage are to be so arranged that one of said devices has vertical movement or adjustment with respect to the other, and I prefer that the cage shall be the movable member, and have accordingly illustrated such construction in the drawings.

The cage is shown as a projecting structure integral with the follower F, which is disposed within and free for vertical movement with respect to the tubular standard A, the projecting members of said cage extending through suitable vertical slots in the front of the standard A.

When the parts of the cage are elevated to the limit of their movement, they occupy, with relation to the supporting arm and the balance bar trunnion, the position shown in Figure 5, in which position, as is evident, the parts of the cage correctly center the trunnions of the balance bar upon the spheres of the supporting arm.

The position shown in Figure 5 may for the purpose of description be assumed to be the normal position of the parts, being the position in which the balance bar is most firmly held against accidental displacement.

When then it is desired to weigh on the scale pans assumed to be attached to the balance bar, a substance the weight of which is to be determined with very great accuracy, the cage is lowered to the position shown in Figure 6, in which the upper edges of the cage are below the upper surfaces of the spheres mounted on the supporting arm, leaving the trunnions of the balance bar in balance upon the projecting portions of the spheres, there then being, as is obvious, no other support for the balance bar or its trunnions.

After the weighing operation the cage may be elevated to the position shown in Figure 5.

If, in the course of the operation of weighing, when the parts are in the position shown in Figure 6, the trunnions D should by any abruptness in the movement of the balance bar, or otherwise, slip down laterally from the spheres, and rest upon the upper edges of the cage, they may be restored to position upon the spheres by simply elevating the cage to the position shown in Figure 5, and then lowering it again to the position shown in Figure 6,—an operation performed in a moment.

The cage, therefore, serves as a restoring or centering device for the trunnions of the balance bar in delicate operations of weighing.

When it is desired to weigh articles as to which no great delicacy is required, the cage may be set in the position shown in Figure 7, in which while the balance bar trunnions rest and bear upon the spheres of the supporting arm, the upper ends of the cage members afford such slight lateral support as will secure said trunnions from slipping laterally from the spheres.

Any convenient means may be resorted to for effecting the movement of the cage with respect to the scale arm. In the drawings I show as a device for effecting said movement a key G formed as a tube projecting through the recess A² of the base A' and provided as to its respective protruding extremities with a nut $g$, and a rigidly affixed sleeve $g'$ which is equipped with a milled operating head $g^2$.

That portion of the tube G which extends beneath the follower F is cut away as shown, leaving the respective extremital portions connected merely by a segment $g^3$.

H is an operating pin mounted within the interior of the tube G and adapted for independent rotative movement therein. Its respective extremities are provided with collars or projections $h\ h$ which present against the respective extremities of the tube G so that the tube and pin are incapable of independent longitudinal movement.

One end of said pin is provided with a milled operating head $h'$. That portion of the pin which extends beneath the follower F is cut away to form the flat web $h^2$ as shown in Figure 4.

As will be understood, when the tube G is rotated to bring its segment into the position shown in Figure 4, the follower F will be elevated and the cage will be raised to the upper extreme position shown in Figure 5.

When said tube is rotated, carrying with it the pin, until the parts occupy a position the reverse of that shown in Figure 4, the lower end of the follower F will rest against the flat face of the part $h^2$ of the pin and the cage will then occupy the lower extreme position shown in Figure 6.

If then, while the segment of the tube G is in its lowermost position, the pin H be slightly rotated independently of said tube, it will assume the position shown in dotted lines in Figure 4, the follower will rest upon the upturned edge of the part $h^2$ of the pin, and the cage will occupy the intermediate position shown in Figure 7.

Having thus described my invention, I claim—

1. In a scale, in combination, a scale supporting arm, having a relatively fixed convex surface or projection, a balance bar formed with a convex surface or projection through which said bar rests in rolling contact upon the convex surface first named, the axis of the convex surface of the supporting arm being in parallelism with the axis of oscillation of the balance bar, substantially as set forth.

2. In a scale, in combination, a scale supporting arm, having a pair of rounded or convex supporting faces fixed with relation to the balance bar, a balance bar formed with a pair of convex or rounded faces through which said bar rests in rolling contact upon the rounded faces of the supporting arm, the axis of the rounded surface of the balance bar being in parallelism with the axis of the rounded surface of the supporting arm, substantially as set forth.

3. In a scale, in combination, a supporting arm having a pair of hemispherical projections fixed with relation to the balance bar, a balance bar having a pair of cylindrical trunnions through which said bar rests in rolling contact upon said hemispherical projections, substantially as set forth.

4. In a scale, in combination, a scale supporting arm, having a rounded surface or projection fixed with relation to the balance bar, a balance bar having a convex or rounded surface through which said bar rests in rolling contact upon the rounded surface of the supporting arm, and a movable device for restoring the convex face of the bar to its position of rolling contact upon the rounded surface of the arm when accidentally displaced therefrom, substantially as set forth.

5. In a scale, in combination, a scale supporting arm, having a pair of hemispherical projections fixed with relation to the balance bar, a balance bar having trunnions with rounded lower faces adapted to rest in rolling contact upon said hemispherical projections, and a movable centering cage or device, substantially as set forth.

6. In a scale, in combination, a scale supporting arm, having a pair of convex projections, a balance bar, having trunnions with rounded faces which rest in rolling contact upon the convex projections of the supporting arm, a pair of members or plates adapted to be moved to and from a position in which they confine between themselves in vertical alinement the trunnions of the balance bar and the convex projections of the supporting arm, substantially as set forth.

7. In a scale, in combination, a scale arm, a cage consisting of a pair of plates respectively disposed one on either side of said arm and adapted to be moved in concert to and from a position in which they snugly embrace but extend above the upper surface of said arm, two hemispherical projections on the upper edge of said supporting arm, and a balance bar provided with cylindrical trunnions which respectively rest upon the hemispherical projections of the arm.

8. In a scale or similar device, in combination, a supporting arm provided with hemispherical projections, a balance bar having cylindrical trunnions which rest upon said hemispherical projections, a standard upon which said supporting arm is mounted, a pair of plates forming a cage which plates are disposed on either side of said supporting arm, and means for causing the vertical movement of said cage as a whole, substantially as set forth.

9. In a scale or similar device, in combination, a supporting arm provided with hemispherical projections, a balance bar having cylindrical trunnions which rest upon said hemispherical projections, a standard upon which said supporting arm is mounted, a pair of plates forming a cage which plates are disposed on either side of said supporting arm, a follower connected to the cage and mounted on the body of the scale standard and movable with relation thereto, and means situated at the foot of said scale standard for causing the elevation and depression of said follower, substantially as set forth.

10. In combination, the supporting arm, the balance bar, the cage, the follower to which said cage is connected, the supporting standard, a key formed as a cylindrical tube mounted in the foot of said standard, said tube being partly cut away in the region beneath said follower, substantially as set forth.

11. In combination, the supporting arm, the balance bar, the cage, the follower to which said cage is connected, the supporting standard, a key formed as a cylindrical tube mounted in the foot of said standard, said tube being partly cut away in the region beneath said follower, and a pin mounted in the interior of said key, said pin being, in the region beneath the follower, of substantially oblong section, substantially as set forth.

In testimony that I claim the foregoing as my invention I have hereunto signed my name this 2d day of June, A. D. 1899.

WILLIAM F. C. MORSELL.

In presence of—
F. NORMAN DIXON,
THOS. K. LANCASTER.